United States Patent
Seo et al.

(10) Patent No.: US 9,462,586 B2
(45) Date of Patent: Oct. 4, 2016

(54) METHOD AND DEVICE FOR AGGREGATING CARRIERS IN WIRELESS COMMUNICATION SYSTEM

(71) Applicant: LG ELECTRONICS INC., Seoul (KR)

(72) Inventors: Dongyoun Seo, Anyang-si (KR);
Bonghoe Kim, Anyang-si (KR);
Joonkui Ahn, Anyang-si (KR);
Suckchel Yang, Anyang-si (KR);
Hanbyul Seo, Anyang-si (KR);
Seungmin Lee, Anyang-si (KR);
Yunjung Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/389,945

(22) PCT Filed: Apr. 5, 2013

(86) PCT No.: PCT/KR2013/002889
§ 371 (c)(1),
(2) Date: Oct. 1, 2014

(87) PCT Pub. No.: WO2013/151396
PCT Pub. Date: Oct. 10, 2013

(65) Prior Publication Data
US 2015/0055521 A1    Feb. 26, 2015

Related U.S. Application Data

(60) Provisional application No. 61/620,449, filed on Apr. 5, 2012, provisional application No. 61/636,740, filed on Apr. 23, 2012, provisional application No. 61/667,947, filed on Jul. 4, 2012, provisional (Continued)

(51) Int. Cl.
*H04J 3/16* (2006.01)
*H04L 5/00* (2006.01)

(Continued)

(52) U.S. Cl.
CPC ........ *H04W 72/0453* (2013.01); *H04J 3/1694* (2013.01); *H04L 5/001* (2013.01);

(Continued)

(58) Field of Classification Search
None
See application file for complete search history.

(56) References Cited

U.S. PATENT DOCUMENTS 9,331,819 B2    5/2016 Si et al.
2006/0077931 A1*    4/2006 Lee .................. H04B 7/2615
                                                        370/329

(Continued)

FOREIGN PATENT DOCUMENTS

EP          2600549         5/2013
WO      2009/120701        10/2009

(Continued)

OTHER PUBLICATIONS

Nokia Siemens Networks, et al., "Views on inter-band CA with different TDD configurations on different bands," 3GPP TSG-RAN WG1 Meeting #67, R1-114309, Nov. 2011, 8 pages.

(Continued)

*Primary Examiner* — Robert C Scheibel
(74) *Attorney, Agent, or Firm* — Lee, Hong, Degerman, Kang & Walmey; Jonathan Kang; Michael Monaco

(57) ABSTRACT

The present invention relates to a method and a device for aggregating carriers in a wireless communication system. In the method, a first carrier is configured, and a second carrier is configured in addition to the first carrier. The first carrier is a time division duplex (TDD) carrier for which an uplink subframe and a downlink subframe are positioned at different times in a frame, and the second carrier is a carrier only for an uplink, which consists of uplink subframes.

12 Claims, 15 Drawing Sheets

Related U.S. Application Data application No. 61/702,214, filed on Sep. 17, 2012, provisional application No. 61/738,401, filed on Dec. 18, 2012, provisional application No. 61/750,316, filed on Jan. 8, 2013.

(51) Int. Cl.
  *H04W 72/04* (2009.01)
  *H04L 5/14* (2006.01)
  *H04W 76/02* (2009.01)

(52) U.S. Cl.
  CPC .......... *H04L 5/0055* (2013.01); *H04L 5/0064* (2013.01); *H04L 5/14* (2013.01); *H04L 5/1469* (2013.01); *H04W 72/0406* (2013.01); *H04W 72/0446* (2013.01); *H04W 76/02* (2013.01)

(56) References Cited

U.S. PATENT DOCUMENTS

| | | | |
|---|---|---|---|
| 2008/0025236 A1* | 1/2008 | Jones | H04B 7/2615 370/280 |
| 2011/0243012 A1 | 10/2011 | Luo et al. | |
| 2013/0010964 A1* | 1/2013 | Fong | H04L 5/0053 380/277 |
| 2013/0077554 A1* | 3/2013 | Gauvreau | H04L 5/001 370/312 |
| 2015/0055519 A1 | 2/2015 | Lin et al. | |
| 2015/0063250 A1 | 3/2015 | Lahetkangas et al. | |
| 2015/0207594 A1 | 7/2015 | Si et al. | |

FOREIGN PATENT DOCUMENTS

| | | |
|---|---|---|
| WO | 2011/011758 | 1/2011 |
| WO | 2011/038252 | 3/2011 |
| WO | 2012015216 | 2/2012 |

OTHER PUBLICATIONS

PCT International Application No. PCT/KR2013/002889, Written Opinion of the International Searching Authority dated Jul. 26, 2013, 1 page.
Panasonic, "Views on TDD inter-band CA with different UL-DL configurations," 3GPP TSG-RAN WG1 Meeting #67, R1-113803, Nov. 2011, 4 pages.
European Patent Office Application Serial No. 13772831.7, Search Report dated Dec. 22, 2015, 7 pages.
Pantech, "Multiple TA for CA with RRH and repeater," 3GPP TSG RAN WG1 Meeting #66, R1-112695, Aug. 2011, 6 pages.
Intel Corporation, "Open issues of CA for different TDD UL-DL configurations," 3GPP TSG-RAN WG1 #68, R1-120208, Feb. 2012, 6 pages.
Korean Intellectual Property Office Application Serial No. 10-2014-7027693, Office Action dated Oct. 1, 2015, 4 pages.
European Patent Office Application Serial No. 137728341.7, Search Report dated Mar. 31, 2016, 12 pages.
United States Patent and Trademark Office U.S. Appl. No. 14/390,315, Notice of Allowance dated May 26, 2016, 8 pages.

* cited by examiner

FIG. 10

| (a) | D | D | D | D | D | D | D | D | D | D |

| (b) | D | D |   |   |   | D | D |   |   |   | UL-DL CONFIGURATION 0

METHOD AND DEVICE FOR AGGREGATING CARRIERS IN WIRELESS COMMUNICATION SYSTEM

CROSS-REFERENCE TO RELATED APPLICATIONS

This application is the National Stage filing under 35 U.S.C. 371 of International Application No. PCT/KR2013/002889, filed on Apr. 5, 2013, which claims the benefit of U.S. Provisional Application Serial Nos. 61/620,449, filed on Apr. 5, 2012 and 61/636,740, filed on Apr. 23, 2012, 61/667,947, filed on Jul. 4, 2012, 61/702,214, filed on Sep. 17, 2012, 61/738,401, filed on Dec. 18, 2012 and 61/750,316, filed on Jan. 8, 2013, the contents of which are all hereby incorporated by reference herein in their entirety.

BACKGROUND OF THE INVENTION

1. Field of the Invention

The present invention relates to wireless communications, and more particularly, to a method and apparatus for aggregating carriers in a wireless communication system.

2. Related Art

A carrier aggregation system has recently drawn attention. The carrier aggregation system implies a system that configures a broadband by aggregating one or more component carriers (CCs) having a bandwidth smaller than that of a target broadband when the wireless communication system intends to support the broadband. In the carrier aggregation system, a term, serving cell, is also used instead of the CC. Herein, the serving cell consists of a pair of downlink component carrier (DL CC) and uplink component carrier (UL CC), or consists of only the DL CC. That is, the carrier aggregation system is a system in which a plurality of serving cells is assigned to one user equipment.

Conventionally, in the carrier aggregation system, it is considered to aggregate only CC of the same mode. That is, it is considered to aggregate the CCs that operate in the frequency division duplex (FDD) mode or to aggregate the CCs that operate in the time division duplex (TDD) mode. Particularly, in case of the TDD, it is assumed that the CCs which are aggregated use the same uplink-downlink (UL-DL) configuration. The UL-DL configuration is to notify which one is used either uplink (UL) or downlink (DL) for the respective subframes within the frame that is made up of of multiple subframes.

However, in the future wireless communication system, it may not be required to confine the above considerations. In such a case, the method of performing carrier aggregation may be problematic, and it is also problematic how to determine the timing between the scheduling information and the data channel which is scheduled and the timing between acknowledgement/not-acknowledgement (ACK/NACK) for the data channel.

SUMMARY OF THE INVENTION

The present invention provides a method and apparatus for aggregating carriers in a wireless communication system.

In an aspect, a method for aggregating carriers in a wireless communication system includes configuring a first carrier; and configuring a second carrier in addition to the first carrier, wherein the first carrier is a time division duplex (TDD) carrier in which uplink subframe and downlink subframe are located on different time in a frame, and wherein the second carrier is a uplink only carrier comprised of uplink subframe only.

In another aspect, an apparatus for aggregating carriers in a wireless communication system includes a radio frequency (RF) unit that transmits and receives a radio signal; and a processor operating functionally connected with the RF unit, wherein the process is configured to perform, configuring a first carrier; and configuring a second carrier in addition to the first carrier, wherein the first carrier is a time division duplex (TDD) carrier in which uplink subframe and downlink subframe are located on different time in a frame, and wherein the second carrier is a uplink only carrier comprised of uplink subframe only.

Even in case of introducing a carrier of new type that does not have backward compatibility with the existing carriers defined in a wireless communication system, it is available to perform carrier aggregation effectively. In addition, a timing between the UL grand and the PUSCH, the HARQ-timing according to the carrier aggregation can be provided.

BRIEF DESCRIPTION OF THE DRAWINGS

FIG. 10 exemplifies the DL only carrier.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

A communication from the BS to the UE is called a downlink (DL), and a communication from the UE to the BS is called an uplink (UL). A wireless communication system including the BS and the UE may be a time division duplex (TDD) system or a frequency division duplex (FDD) system. The TDD system is a wireless communication system for performing UL and DL transmission/reception by using different times at the same frequency band. The FDD system is a wireless communication system capable of simultaneously performing UL and DL transmission/reception by using different frequency bands. The wireless communication system can perform communication by using a radio frame.

Figure 1:
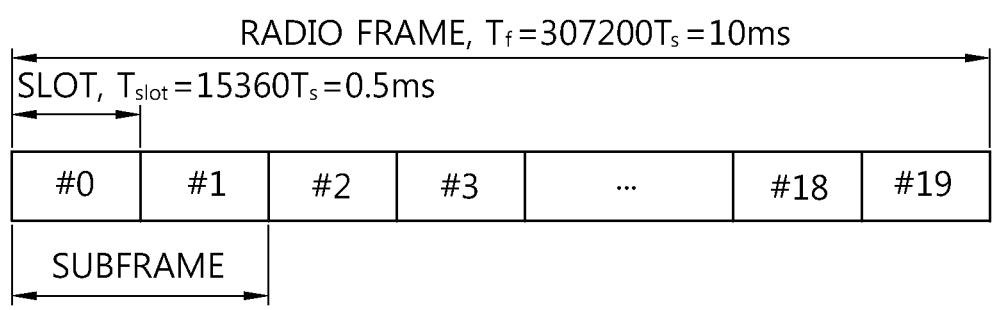
FIG. 1 shows a structure of an FDD radio frame.

FIG. 1 shows a structure of an FDD radio frame.

The FDD radio frame (hereinafter, simply referred to as FDD frame) includes 10 subframes. One subframe includes two consecutive slots. Slots included in the FDD frame are indexed from 0 to 19. The time which is required to transmit one subframe is defined as transmission time interval (TTI) and the TTI may be a minimum scheduling unit. For example, one subframe may have a length of 1 millisecond (ms), and one slot may have a length of 0.5 ms. Assuming that the length of a wireless frame is $T_f$, $T_f$=307200 Ts=10 ms (milli-second).

Figure 2:
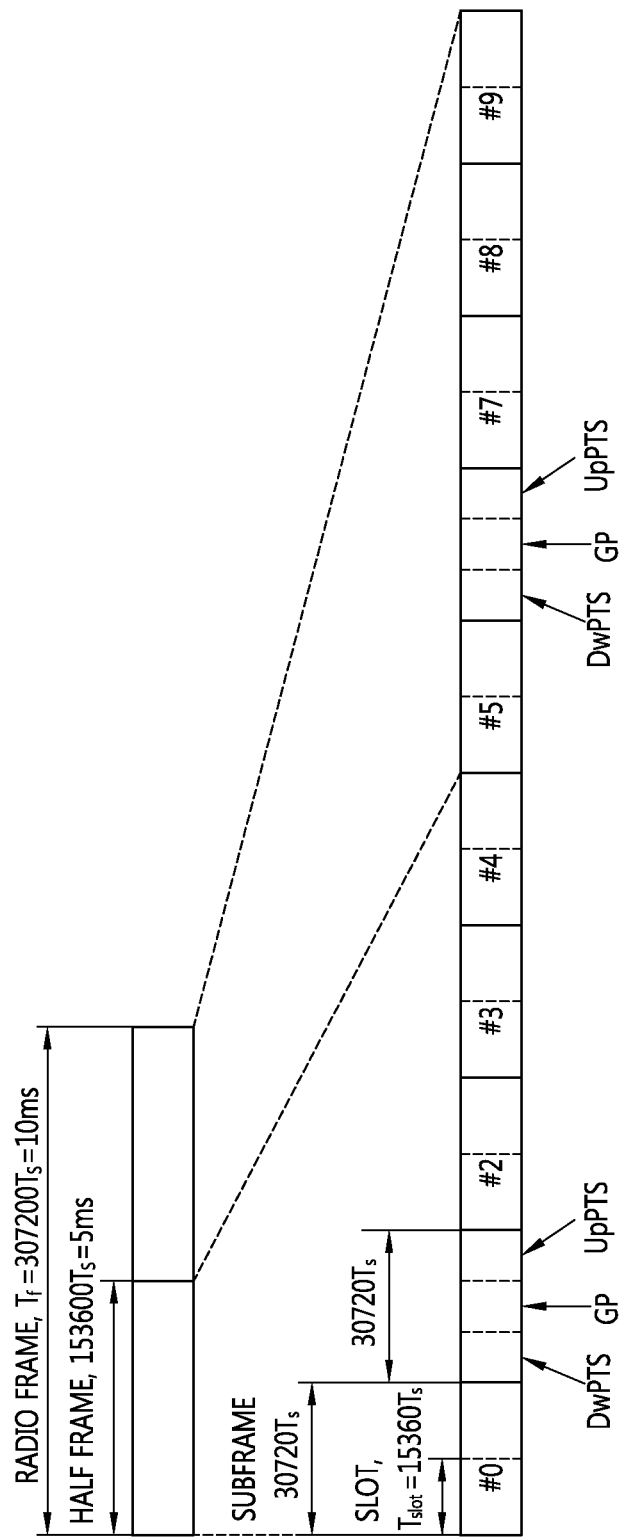
FIG. 2 shows a structure of a TDD radio frame.

FIG. 2 shows a structure of a TDD radio frame.

Referring to FIG. 2, the TDD radio frame (hereinafter, TDD frame) includes 2 half-frames 10 subframes, and 5 subframes are included in a half-frame, consequently the TDD frame includes total 10 subframes. The TDD frame includes an uplink (UL) subframe, a downlink (DL) subframe and a specific subframe (S subframe). When subframes of the TDD frame are indexed starting from 0, a subframe having an index #1 and an index #6 may be a special subframe, and the special subframe includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between uplink and downlink. The GP and the UpPTS take a role of a time gap.

As described above, in the TDD frame, a downlink (DL) subframe and an uplink (UL) subframe coexist. Table 1 below shows an example of a UL-DL configuration of a radio frame.

includes a plurality of sequential subcarriers in the frequency domain. The number $N_{RB}$ of RBs included in the DL slot depends on a DL transmission bandwidth configured in a cell. For example, in the LTE system, $N_{RB}$ may be one in the range of 6 to 110. A structure of a UL slot may be the same as the aforementioned structure of the DL slot.

Each element on the resource grid is referred to as a resource element (RE). The RE on the resource grid can be identified by an index pair (k, l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Figure 3:
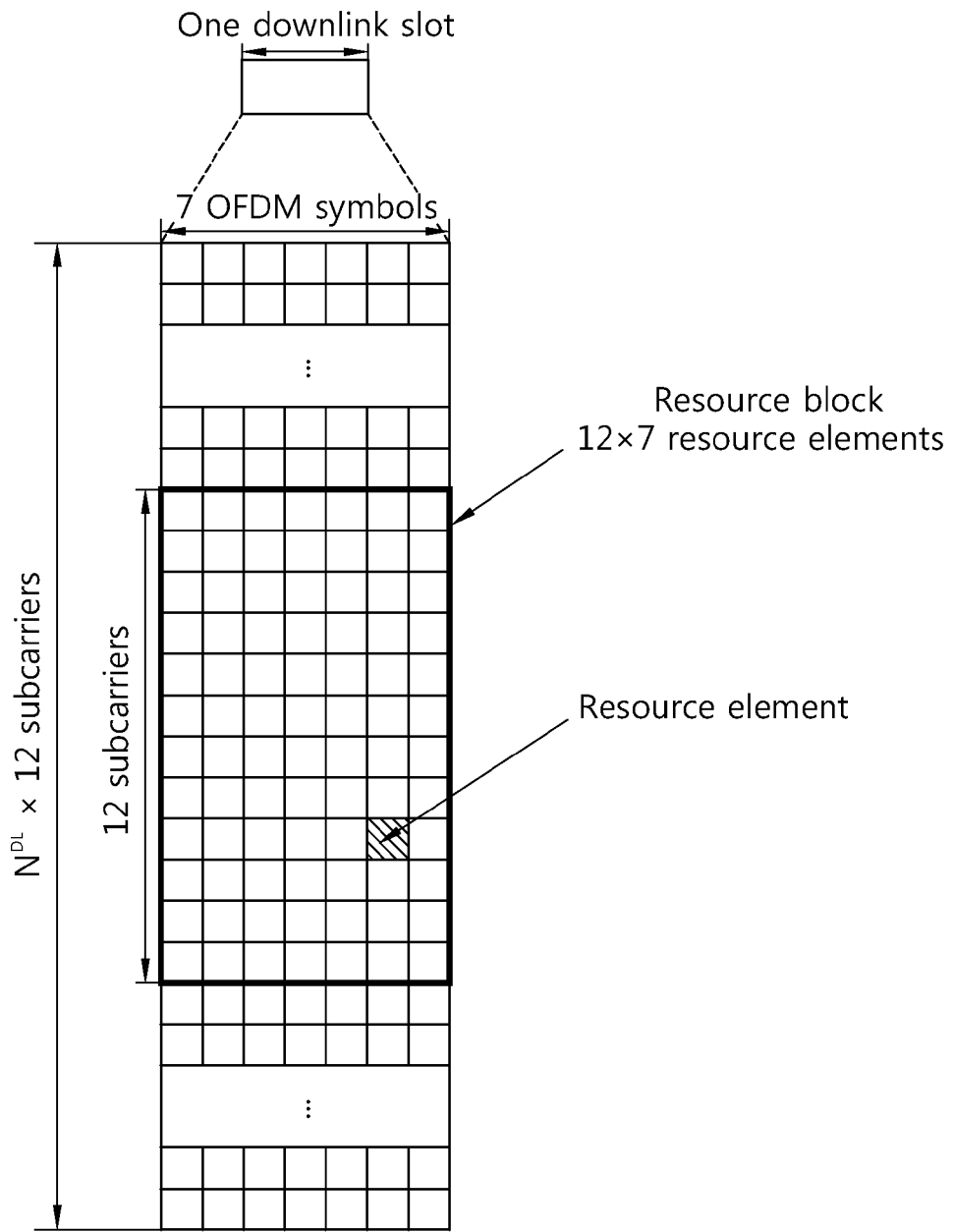
FIG. 3 shows an example of a resource grid for one DL slot.

Although it is described in FIG. 3 that one resource block includes 7×12 REs consisting of 7 OFDM symbols in the time domain and 12 subcarriers in the frequency domain for example, the number of OFDM symbols and the number of subcarriers in the resource block are not limited thereto. The number of OFDM symbols and the number of subcarriers may change variously depending on a cyclic prefix (CP) length, a frequency spacing, etc. For example, if the CP length corresponds to an extended CP, the resource block includes 6 OFDM symbols. The number of subcarriers in one OFDM symbol may be selected from 128, 256, 512, 1024, 1536, and 2048.

Figure 4:
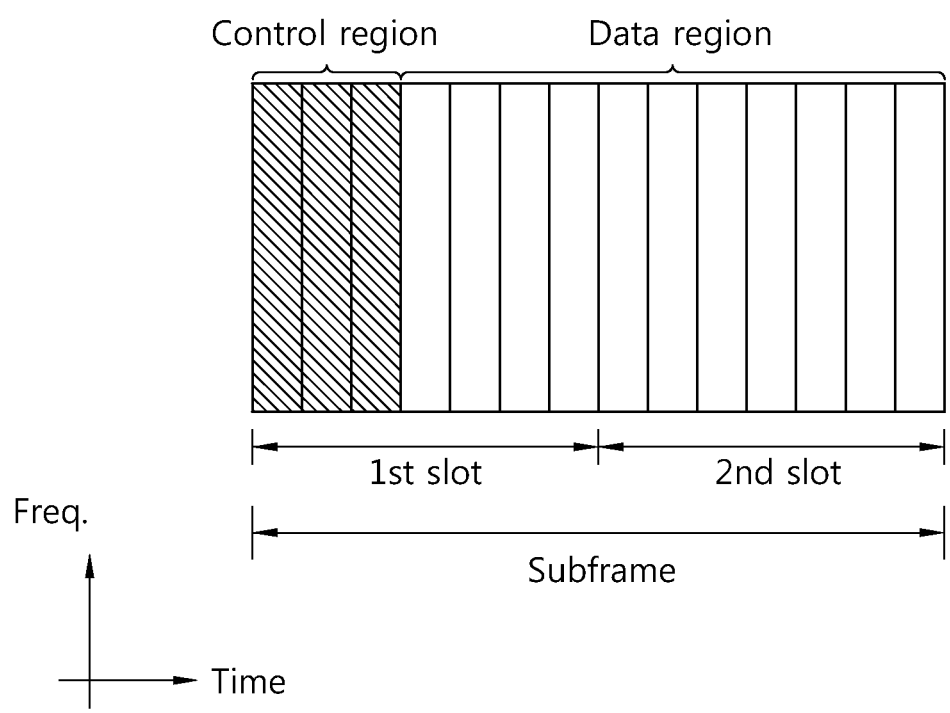
FIG. 4 shows a structure of a DL subframe.

FIG. 4 shows a structure of a DL subframe.

Referring to FIG. 4, the DL subframe is divided into a control region and a data region in the time domain. The control region includes up to three (optionally, up to four) preceding OFDM symbols of a first slot in the subframe. However, the number of OFDM symbols included in the control region may vary. A physical downlink control channel (PDCCH) and another control channel are allocated to the control region, and a physical downlink shared channel (PDSCH), and a physical broadcast channel (PBCH) are allocated to the data region.

A physical control format indicator channel (PCFICH) transmitted in a first OFDM symbol of the subframe carries a control format indicator (CFI) regarding the number of OFDM symbols (i.e., a size of the control region) used for transmission of control channels in the subframe. The UE first receives the CFI on the PCFICH, and thereafter moni-

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' represents a DL subframe, 'U' represents a UL subframe, 'S' represents a special subframe. If receiving the UL-DL configuration, the UE may be aware whether each of the subframes in the TDD subframe is a DL subframe (or S subframe) or a UL subframe.

FIG. 3 shows an example of a resource grid for one DL slot.

Referring to FIG. 3, the DL slot includes a plurality of orthogonal frequency division multiplexing (OFDM) symbols in a time domain, and includes $N_{RB}$ resource blocks (RBs) in a frequency domain. The RB is a resource allocation unit, and includes one slot in the time domain and tors the PDCCH. Unlike the PDCCH, the PCFICH does not use blind decoding, and is transmitted by using a fixed PCFICH resource of the subframe.

A physical hybrid-ARQ indicator channel (PHICH) which is transmitted from the control region, and carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The BS determines a PDCCH format according to DCI to be transmitted to the UE, attaches a cyclic redundancy check (CRC) to the DCI, and masks a unique identifier (referred to as a radio network temporary identifier (RNTI)) to the CRC according to an owner or usage of the PDCCH.

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. When the C-RNTI is used, the PDCCH carries control information for a specific UE (such information is called UE-specific control information), and when another RNTI is used, the PDCCH carries common control information received by all or a plurality of UEs in a cell.

The BS encodes the CRC-attached DCI to generate coded data. The encoding includes channel encoding and rate matching. Thereafter, the BS modulates the coded data to generate modulation symbols, and transmits the modulation symbols by mapping the symbols to a physical resource element (RE).

A PDSCH transmitted in the data region is a downlink data channel. System information, data, etc., can be transmitted through the PDSCH. In addition, the PBCH carries system information necessary for communication between the UE and the BS. The system information transmitted through the PBCH is referred to as a master information block (MIB). In comparison thereto, system information transmitted on the PDCCH is referred to as a system information block (SIB).

Figure 5:
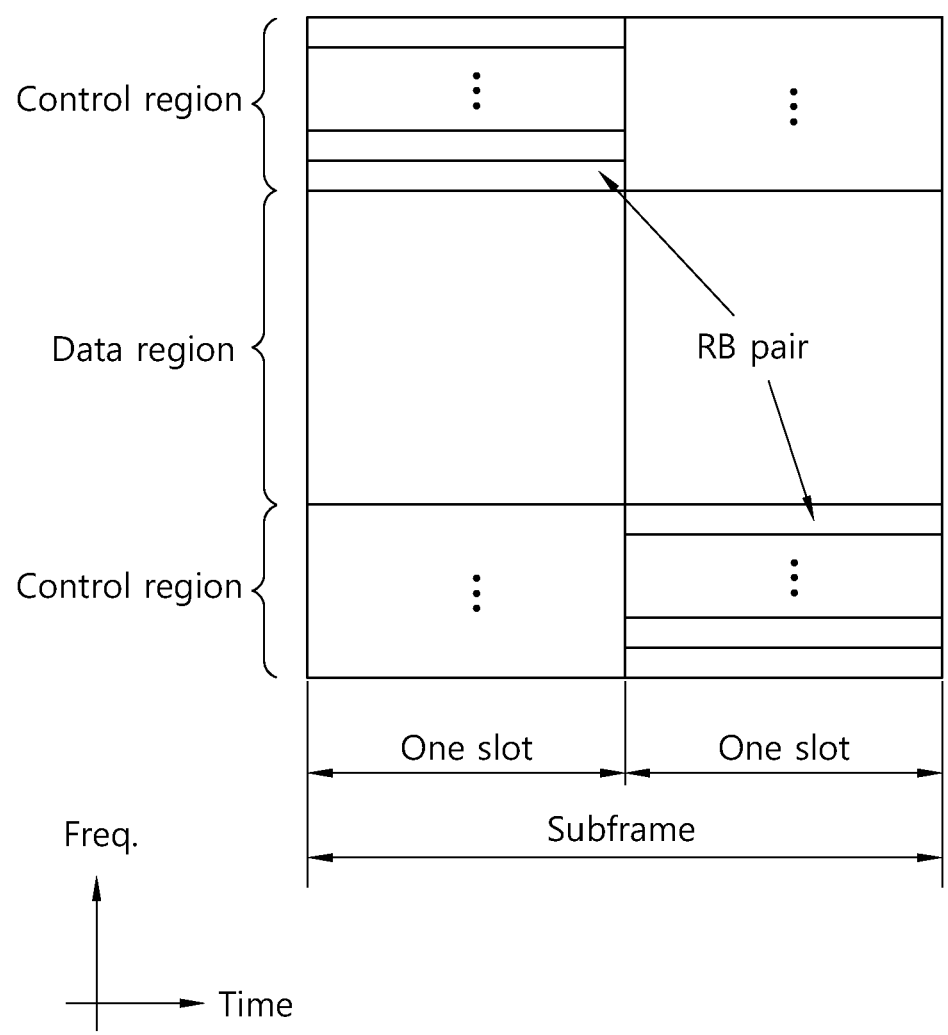
FIG. 5 shows a structure of a UL subframe.

FIG. 5 shows a structure of a UL subframe.

Referring to FIG. 5, the UL subframe can be divided into a control region and a data region. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a first slot and a second slot.

Figure 6:
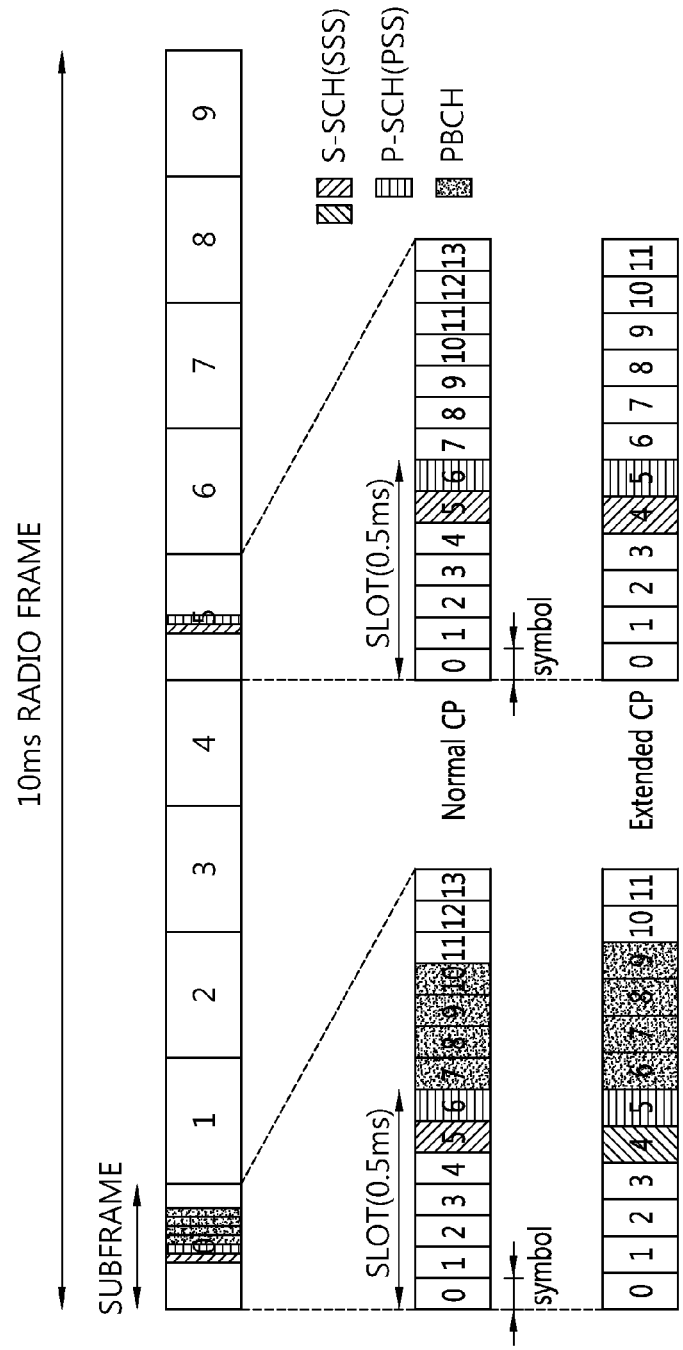
FIG. 6 shows a frame structure for synchronization signal transmission in the conventional FDD frame.

FIG. 6 shows a frame structure for synchronization signal transmission in the conventional FDD frame. A slot number and a subframe number start from 0.

Herein, a synchronization signal is a signal used when a cell search is performed, and includes a primary synchronization signal (PSS) and a secondary synchronization signal (SSS).

The synchronization signal can be transmitted in each of subframes #0 and #5 by considering a global system for mobile communication (GSM) frame length of 4.6 ms to facilitate inter-RAT measurement. A boundary for the frame can be detected through the SSS. More specifically, in the FDD system, the PSS is transmitted in a last OFDM symbol of $0^{th}$ and $10^{th}$ slots, and the SSS is transmitted in an immediately previous OFDM symbol of the PSS. The synchronization signal can transmit 504 physical cell IDs by combining 3 PSSs and 168 SSSs. A physical broadcast channel (PBCH) is transmitted in first 4 OFDM symbols of a first slot. The synchronization signal and the PBCH are transmitted within 6 RBs in a system bandwidth, so as to be detected or decoded by a UE irrespective of a transmission bandwidth. A physical channel for transmitting the PSS is called a P-SCH, and a physical channel for transmitting the SSS is called an S-SCH.

A transmit diversity scheme of the synchronization signal uses only a single antenna port, and is not separately defined in the standard. That is, single antenna transmission or UE-transparent transmission (e.g., precoding vector switching (PVS), time switched transmit diversity (TSTD), cyclic delay diversity (CDD)) can be used.

For the PSS, a length-63 Zadoff-Chu (ZC) sequence is defined in a frequency domain and is used as a sequence of the PSS. The ZC sequence is defined by Equation 1. A sequence element corresponding to a DC subcarrier, i.e., n=31, is punctured. In Equation 1, Nzc=63.

$$d_u(n) = e^{-j\frac{\pi u n(n+1)}{N_{ZC}}} \quad \text{[Equation 1]}$$

Among 6 RBs (i.e., 72 subcarriers), 9 (=72−63) remaining subcarriers are always transmitted with a value of '0', which facilitates a filter design for performing synchronization. To define 3 PSSs, u=25, 29, and 34 are used in Equation 1. In this case, since 29 and 34 have a conjugate symmetry relation, two correlations can be simultaneously performed. Herein, the conjugate symmetry implies the relation of Equation 2 below, and by using this characteristic, a one-shot correlator can be implemented for u=29, 34, and an overall computation amount can be decreased by about 33.3%.

$d_u(n)=(-1)^n(d_{N_{ZC}-u}(n))^*$, when $N_{ZC}$ is even number.

$d_u(n)=(d_{N_{ZC}-u}(n))^*$, when $N_{ZC}$ is odd number. [Equation 2]

A sequence used for the SSS is used by interleaving two m-sequences having a length of 31. The SSS can transmit 168 cell group IDs by combining two sequences. An m-sequence used as a sequence of the SSS is robust to a frequency selective environment, and can decrease a computation amount according to a fast m-sequence transform using a fast Hadamard transform. In addition, it is proposed to configure the SSS by using two short codes in order to decrease a computation amount of the UE.

Figure 7:
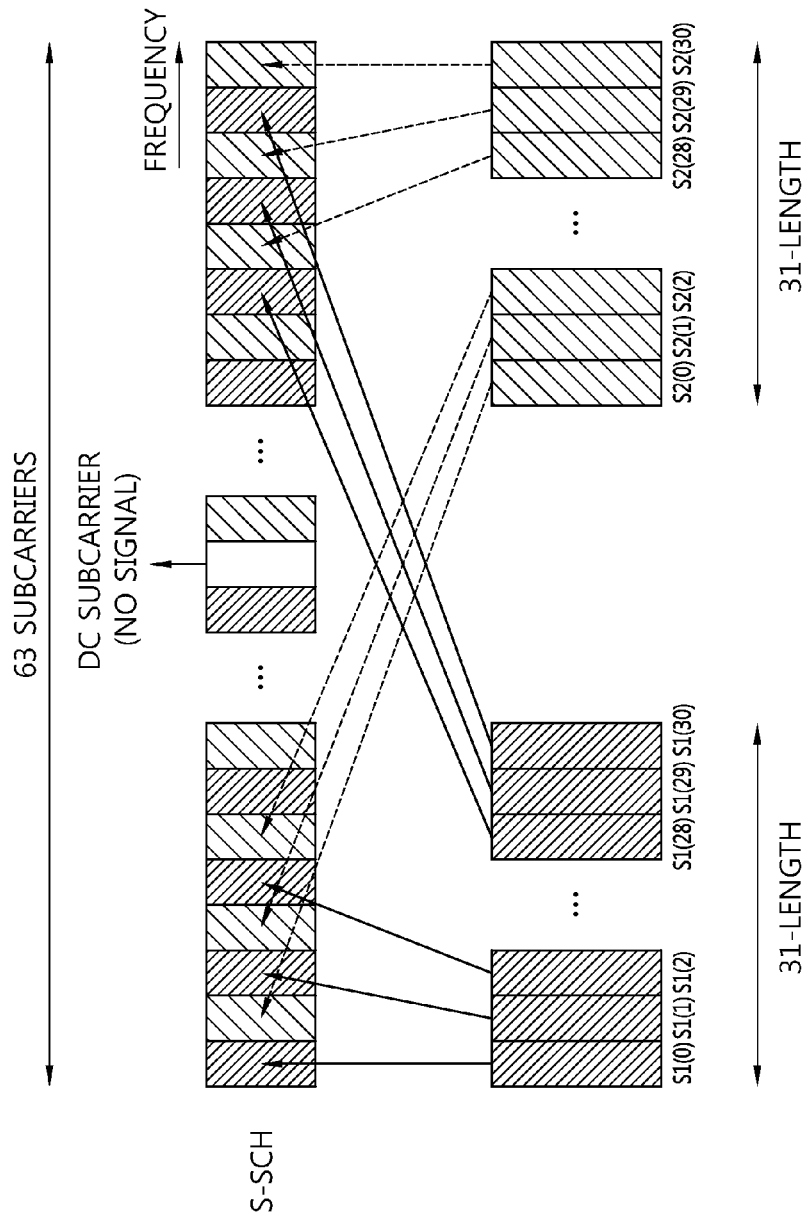
FIG. 7 shows a case where two sequences in a logical domain are interleaved and mapped in a physical domain.

FIG. 7 shows a case where two sequences in a logical domain are interleaved and mapped in a physical domain.

Referring to FIG. 7, when two m-sequences used to generate an SSS code are respectively defined by S1 and S2, if an SSS of a subframe 0 transmits a cell group ID by combining the two sequences (S1, S2), an SSS of a subframe 5 is transmitted by swapping to (S2, S1), thereby being able to identify a boundary of 10 m frame. The SSS code used herein uses a generator polynomial of $x^5+x^2+1$, and 31 codes can be generated by using different circular shifts.

To improve reception performance, two different PSS-based sequences are defined and then are scrambled to an SSS such that different sequences are scheduled to S1 and S2. Thereafter, an S1-based scheduling code is defined, and scheduling is performed on S2. In this case, a code of the SSS is swapped in a unit of 5 ms, whereas the PSS-based scrambling code is not swapped. The PSS-based scrambling code can be defined as a version of 6 circular shifts according to an index of PSS at an m-sequence generated from a generator polynomial of $x^5+x^3+1$. The S1-based scrambling code can be defined as a version of 8 circular shifts according to an index of S1 at an m-sequence generated from a generator polynomial of $x^5+x^4+x^3+x^2+x^1+1$.

Figure 8:
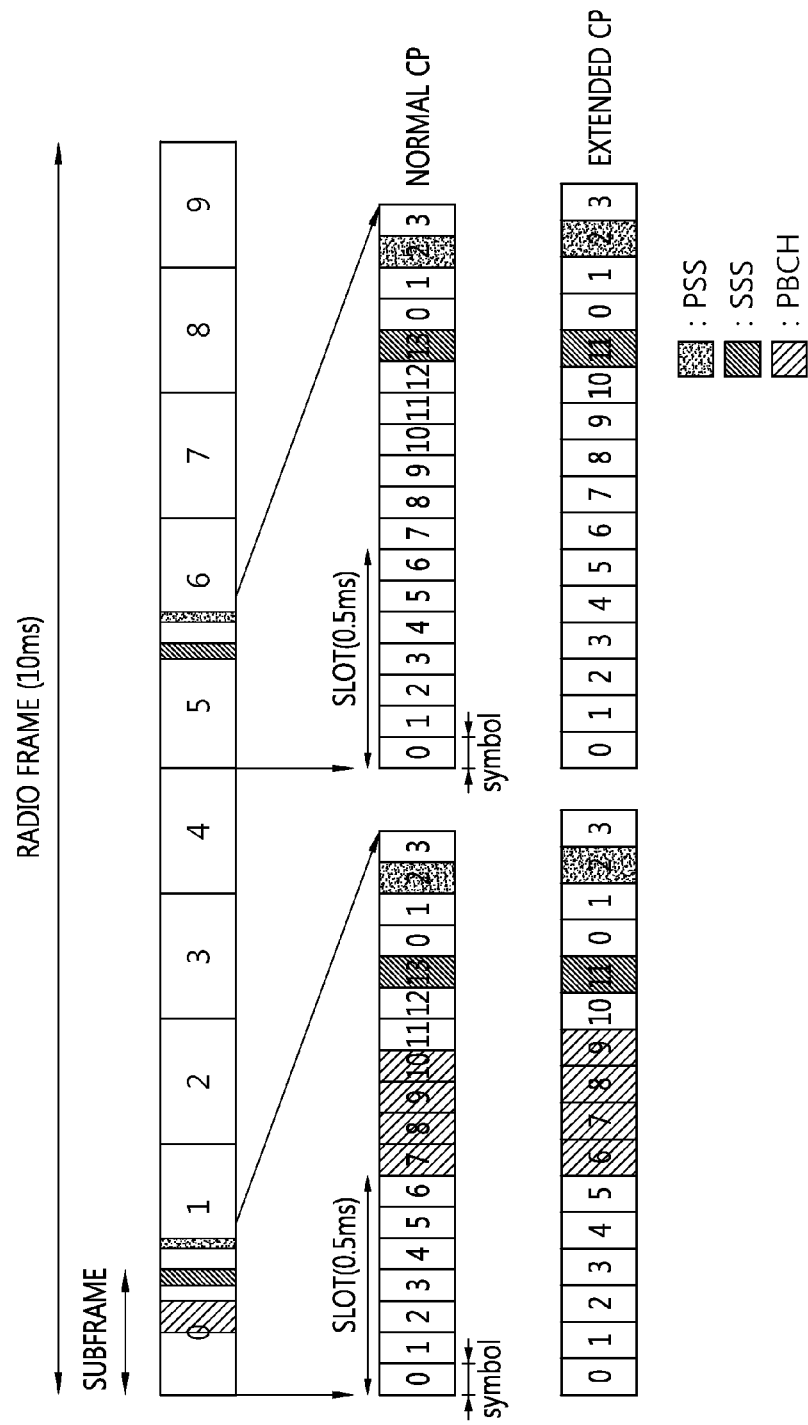
FIG. 8 shows a frame structure for transmitting a synchronization signal in the conventional TDD frame.

FIG. 8 shows a frame structure for transmitting a synchronization signal in the conventional TDD frame.

In a TDD frame, a PSS is transmitted in a third OFDM symbol of third and $13^{th}$ slots. An SSS is transmitted three OFDM symbols earlier than the OFDM symbol in which the PSS is transmitted. A PBCH is transmitted in first 4 OFDM symbols of a second slot of a first subframe.

Now, a carrier aggregation system will be described.

Figure 9:
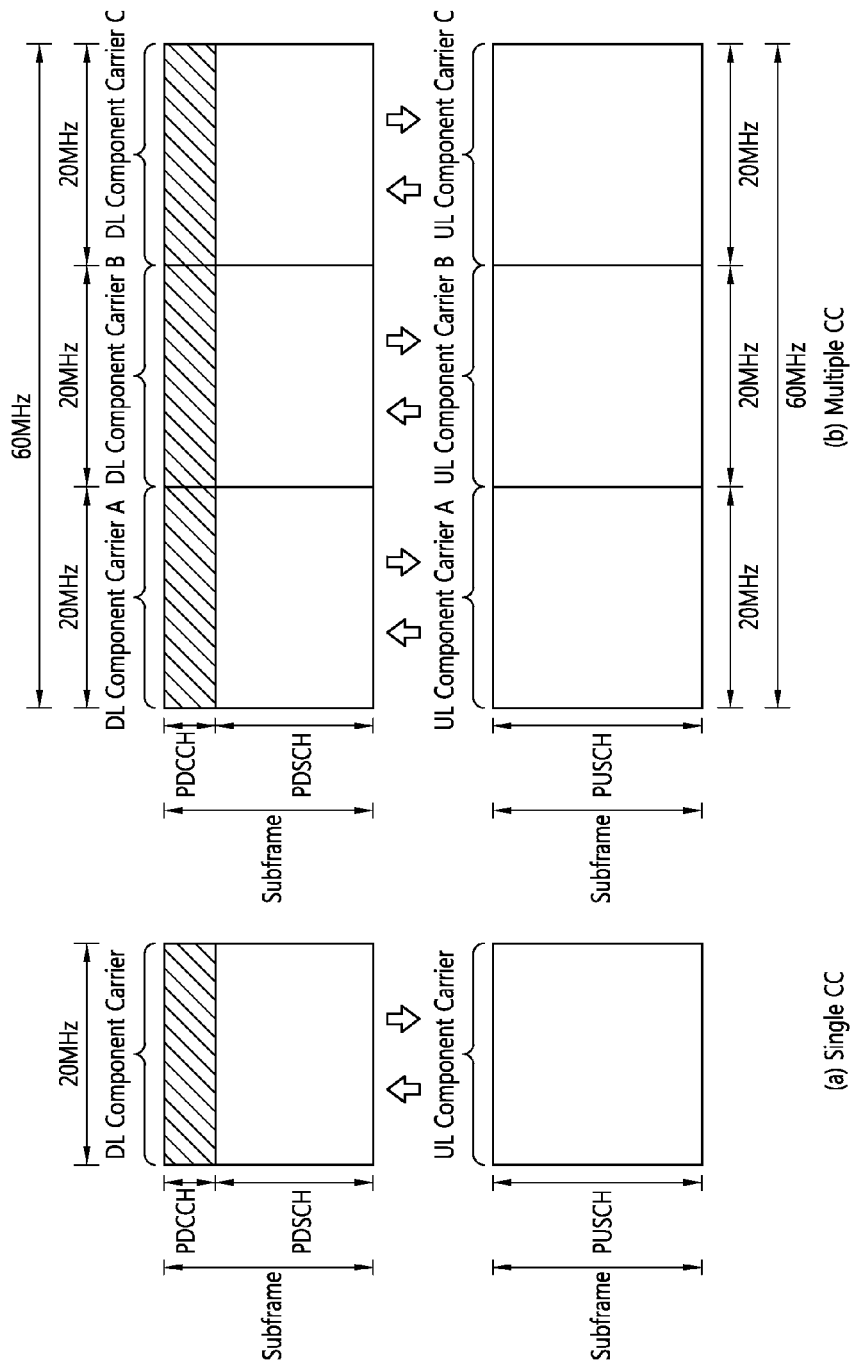
FIG. 9 shows an example of comparing a single-carrier system and a carrier aggregation system.

FIG. 9 shows an example of comparing a single-carrier system and a carrier aggregation system.

Referring to FIG. 9, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA) system. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

When carrier aggregation is configured, the UE has only one RRC connection with the network. In an RRC connection establishment/re-establishment, handover process, one cell provides non-access stratum (NAS) mobility information and a security input. Such a cell is called a primary cell. In other words, the primary cell implies one serving cell which provides a security input in an RRC connection establishment procedure/connection re-establishment procedure/handover procedure performed by the UE with respect to the BS.

The secondary cell implies a cell configured to provide an additional radio resource after establishing an RRC connection through the primary cell.

The serving cell is configured with the primary cell in case of a UE of which carrier aggregation is not configured or which cannot provide the carrier aggregation. If the carrier aggregation is configured, the term 'serving cell' is used to indicate a cell configured for the UE, and the cell may be plural in number. A plurality of serving cells may be configured with a set consisting of a primary cell and one or a plurality of cells among all secondary cells.

A primary component carrier (PCC) denotes a CC corresponding to the primary cell. The PCC is a CC that establishes an initial connection (or RRC connection) with the BS among several CCs. The PCC serves for connection (or RRC connection) for signaling related to a plurality of CCs, and is a CC that manages a UE context which is connection information related to the UE. In addition, the PCC establishes a connection with the UE, and thus always exists in an activation state when in an RRC connected mode. A downlink CC corresponding to the primary cell is called a downlink primary component carrier (DL PCC), and an uplink CC corresponding to the primary cell is called an uplink primary component carrier (UL PCC).

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state. A DL CC corresponding to the secondary cell is called a DL secondary CC (SCC). A UL CC corresponding to the secondary cell is called a UL SCC.

The primary cell and the secondary cell have the following features from a perspective of each UE.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can change by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection process. When adding a new secondary cell, RRC signaling can be used for transmission of system information of a dedicated secondary cell.

Regarding a CC constituting a serving cell, a DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC (carrier #0)+20 MHz CC (carrier #1)+20 MHz CC (carrier #2)+20 MHz CC (carrier #3)+5 MHz CC (carrier #4).

As described above, the carrier aggregation system can support multiple component carriers (CCs) unlike a single-carrier system.

The present invention will now be described.

In the carrier aggregation system, one UE may transmit and receive data/control information using multiple cells. The UE uses a cell that is initially connected as a primary cell, and uses the cell that is additionally configured through the primary cell as a secondary cell.

As described above, the primary cell is used for the operation for maintaining the connection between a BS and a UE. For example, in the primary cell may be performed the operations such as radio link management (RLM), radio resource management (RRM), reception of system information, physical random access channel (PRACH) transmission, uplink control channel (PUCCH) transmission, and the like. Meanwhile, the secondary cell is mainly used for the transmission of the scheduling information for data channels or the data channels.

The primary cell and the secondary cell are UE-specific. When multiple cells exist in a system, each of the cells may be used for the primary cell or the secondary cell, and each of the UEs uses one of the multiple cells as the primary cell. That is, an arbitrary cell may be used as the primary cell or the secondary cell. Accordingly, all of the cells are configured to perform the operation of the primary cell.

In other words, all of the cells are expected to implement all of these operations such as the transmission of synchronization signal, the transmission of broadcast channel, the transmission of CRS, the configuration of PDCCH region, and the like are implemented. Those cells may be referred to as backward compatible cells or legacy carrier type (LCT) in the aspect of carrier.

Meanwhile, if a cell is used as the secondary cell in the future wireless communication system, it is considered to introduce the cell of which a part or all of the unnecessary information is removed. Such a cell may be represented not to have backward compatibility, and referred to as a new carrier type (NCT) or extension carrier in comparison with the LCT. For example, in the NCT, it may be configured to transmit the CRS only at a part of time interval or only at frequency interval without transmitting in every subframe, or the DL control channel region may be newly configured, which is specified for each UE by removing the DL control channel region such as existing PDCCH or reducing to a time region or frequency region. Such an NCT may be a carrier in which only DL transmission is allowed. Hereinafter, the carrier in which only DL transmission is allowed is short for a DL only carrier, for the convenience.

Figure 10:
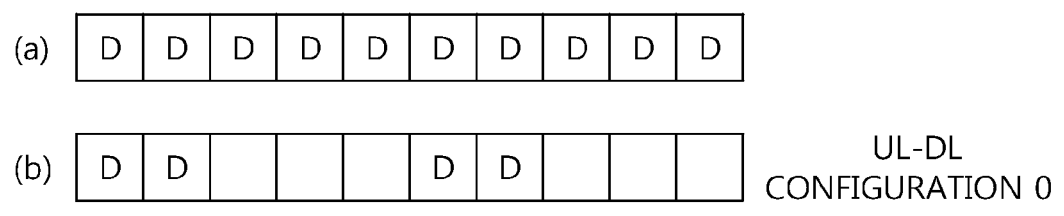

FIG. 10 exemplifies the DL only carrier.

The DL only carrier may be configured by various methods. For example, in FDD, the DL only carrier may be a cell in which only DL CC exists. That is, as shown in FIG. 10(a), in FDD, the DL only carrier may be the DL CC in which corresponding UL CC does not exist. Or, even for the DL CC in which exists the UL CC that is linked by system information block (SIB), the DL only carrier may be configured by setting to use only DL CC without using the UL CC.

In TDD, the DL only carrier uses the UL-DL configuration of Table 1 and it is available to be generated to use the DL subframe only according to the corresponding UL-DL configuration. In the LCT, UL subframe/DL subframe are included by time division in a frame according to the UL-DL configuration defined in Table 1, but in the DL only carrier, only DL subframe is included as shown in FIG. 10(b). However, such a method causes resource waste since the subframe which is supposed to be configured as UL subframe is not going to be used according to the UL-DL configuration.

Accordingly, in case that the DL only carrier is used in TDD, it is preferable that all of the subframes in a frame are comprised of DL subframes only.

For this, additional UL-DL configuration may be added in the conventional UL-DL configuration as shown in Table 1. The following table represents an example of UL-DL configuration according to the present invention.

TABLE 2

| Uplink-downlink configuration | Downlink-to-Uplink Switch-point periodicity | subframe number | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | — | D | D | D | D | D | D | D | D | D | D |

In Table 2, UL-DL configurations 0 to 6 are the same as those of the existing UL-DL configuration, and the UL-DL configuration 7 is added onto it. The UL-DL configuration 7 represents that all of the subframes in a frame are configured as DL subframe. It may be limited that UL-DL configuration 7 is used only for the secondary cell without being used for the primary cell. In other words, in order to avoid interference between frequency bands, it may be limited that the DL only carrier use only frequency band (the secondary cell) which is different from that of the existing TDD primary cell.

Or the BS and the UE may configure the DL only carrier using the following method. That is, the BS transmits the UL-DL configuration and switch information. The UL-DL configuration may be one of the existing UL-DL configurations 0 to 6 of Table 1.

The switch information may be the information that represents UL whether it is changed to the UL subframe in the corresponding UL-DL configuration, and whether it is changed to the DL subframe of a special subframe. According to the switch information, all of the UL subframes (or S subframe) in a frame may be switched to the DL subframe, or only a part of UL subframes (or S subframe) may be switched to DL subframe. The switch information may be implemented in various ways. For example, the switch information represents whether the UL subframe (or S subframe) has been used or not, but what the UL subframe (or S subframe) has been not used may mean that the UL subframe (or S subframe) is used as a DL subframe.

For the configuration of the DL only carrier, it may be applied for the method of stopping the use of the UL subframe (for example, only suspending the channel which is transmitted from the first SC-FDMA symbol are transmitted in the UL subframe such as PUSCH, PUCCH, and so on but available to use the channel which is transmitted from the last SC-FDMA symbol of the UL subframe such as SRS) or the method that the configuration of the UL subframe is changed to the DL subframe to use.

Herein, it is available to change the S subframe to the DL subframe owing to not using the UL subframe. In case of changing the S subframe only to GP and the DL subframe that doesn't contain the UpPTS to use without switching the UL subframe to the DL subframe, there is advantages that the unnecessary GP and UpPTS may be used in downlink and the time relations of the control channel transmission of the DL/UL HARQ process, data channel transmission, HARQ-ACK transmission and so on in the existing UL-DL configuration may be applied same as the existing definition without any changes. Or, in case of utilizing the existing TDD UL-DL configuration not using the UL subframe while the DL subframe is left, it is available to designate to use the UL-DL configuration 5 only which has the least UL subframes.

The UE, if the switch information is detected, switches the UL subframe (or the S subframe) of the UL-DL configuration to the DL subframe. The switch information may transmit in the corresponding cell-specific signaling or UE-specific signaling.

If the DL only carrier use is used for the carrier aggregation, there is an advantage that the DL only carrier use above is shared as the secondary cell between the FDD terminal and the TDD terminal in common Or the NCT may be a carrier in which only UL transmission is allowed. Hereinafter, the carrier in which only UL transmission is allowed is short for a UL only carrier, for the convenience.

Figure 11:
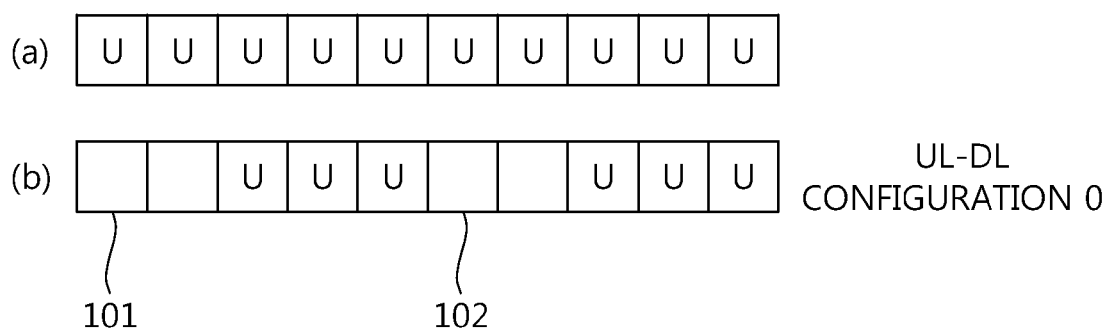
FIG. 11 exemplifies the UL only carrier.

FIG. 11 exemplifies the UL only carrier.

Figure 12:
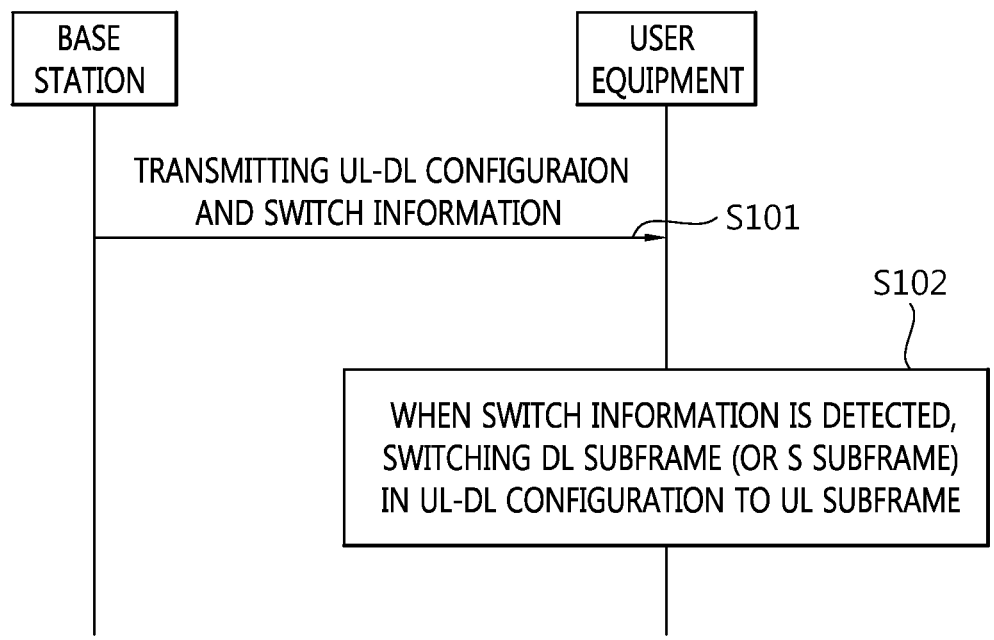
FIG. 12 shows another example of configuring the DL only carrier.

The UL only carrier may be configured by various methods. For example, in FDD, the UL only carrier may be a cell in which only UL CC exists. That is, as shown in FIG. 12(*a*), in FDD, the UL only carrier may be the DL CC in which corresponding UL CC does not exist. Or, even for the UL CC in which exists the UL CC that is linked by system information block (SIB), the UL only carrier may be configured by setting to use only UL CC without using the DL CC.

In TDD, the UL only carrier uses the UL-DL configuration of Table 1 and it is available to be generated to use only UL subframe without using the DL subframe according to the corresponding UL-DL configuration. In the LCT, UL subframe/DL subframe are included by time division in a frame according to the UL-DL configuration defined in Table 1, but in the UL only carrier, only UL subframe is included as shown in FIG. 10(*b*). However, such a method causes resource waste since the subframe (for example, 101 and 102) which is supposed to be configured as DL subframe is not going to be used according to the UL-DL configuration.

Accordingly, in case that the UL only carrier is used in TDD, it is preferable that all of the subframes in a frame are comprised of UL subframes only.

For this, additional UL-DL configuration may be added in the conventional UL-DL configuration as shown in Table 1. The following table represents an example of UL-DL configuration according to the present invention.

TABLE 3

| Uplink-downlink configuration | Downlink-to-Uplink Switch-point periodicity | subframe number |  |  |  |  |  |  |  |  |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |
| 7 | —     | U | U | U | U | U | U | U | U | U | U |

In Table 3, UL-DL configurations 0 to 6 are the same as those of the existing UL-DL configuration, and the UL-DL configuration 7 is added onto it. The UL-DL configuration 7 represents that all of the subframes in a frame are configured as UL subframe. It may be limited that UL-DL configuration 7 is used only for the secondary cell without being used for the primary cell. In other words, in order to avoid interference between frequency bands, the UL only carrier may be used for the secondary cell in a different frequency band which is different from that of the existing TDD primary cell. The method above may define the UL-DL configuration 7 in order to configure the DL only carrier and directly notify it to a UE.

Meanwhile, a BS selects one of the DL only carrier and the UL only carrier and aggregates it as a secondary cell, UL-DL configuration 7 of Table 2 may be added to Table 3. That is, total nine UL-DL configurations may be included in Table 3, and UL-DL configuration 7 of Table 2 may be added to Table 3 as UL-DL configuration 8.

Or, a BS uses the existing UL-DL configurations 0 to 6 but may additionally use the method of transmitting information indicating the DL only carrier or the UL only carrier.

FIG. 12 shows another example of configuring the UL only carrier.

Referring to FIG. 12, the BS transmits the UL-DL configuration and switch information (S101).

The UL-DL configuration may be one of the existing UL-DL configurations 0 to 6 of Table 1.

The switch information may be the information that represents DL whether it is changed to the DL subframe in the corresponding UL-DL configuration, and whether it is changed to the UL subframe of a special subframe. According to the switch information, all of the DL subframes (or S subframe) in a frame may be switched to the UL subframe, or only a part of DL subframes (or S subframe) may be switched to UL subframe. The switch information may be implemented in various ways. For example, the switch information represents whether the DL subframe (or S subframe) has been used or not, but what the DL subframe (or S subframe) has been not used may mean that the DL subframe (or S subframe) is used as a UL subframe.

For the configuration of the UL only carrier, it may be applied for the method of stopping the use of the DL subframe (for example, only suspending the channel which is transmitted to the last OFDM symbol are transmitted in the DL subframe such as PDSCH and so on but available to use the channel which is transmitted from a part of OFDM symbol of DL subframe such as PCFICH, PDCCH, PHICH, channel state information reference signal (CSI-RS) and cell-specific reference signal (CRS)) or the method that the configuration of the DL subframe is changed to the UL subframe to use.

Herein, the case of changing the S subframe to the UL subframe is available owing to not using the DL subframe, and in case of changing the DL subframe to the UL subframe and using it without changing the DL subframe to the UL subframe that doesn't contain the DwPTS and GP, it is available to use unnecessary DwPTS and CP in uplink. Then, there are advantages that the SRS, the transmission of PRACH and so on in the existing UL-DL configuration may be applied same as the existing definition without any changes. In addition, in case of utilizing the existing TDD UL-DL configuration not using the DL subframe while the UL subframe is left, it is available to designate to use the UL-DL configuration 0 only which has the least DL subframes.

The UE, if the switch information is detected, switches the DL subframe (or the S subframe) of the UL-DL configuration to the UL subframe (step, S102). The switch information may be transmitted by the corresponding cell-specific signaling or UE-specific signaling.

The method of defining UL-DL configuration 7 and notifying it directly to the UE in order to configure the UL only carrier and the method with referring to FIG. 12 may be used together. In this case, depending on a UE, all subframes of the UL only carrier may be used as the UL subframe, or a part of subframes of the UL only carrier may be used as the UL subframe.

Meanwhile, the UL only carrier may exceptionally include the DL subframe that transmits essential information such as PSS/SSS and system information. That is, the UL only carrier may be defined as the carrier in which all subframes in the frame except the DL subframe that transmits the essential information by the BS are configured as the UL subframe.

If the UL only carrier is used for carrier aggregation, there is advantage that the FDD UE and TDD UE may share the UL only carrier as the secondary cell. The carrier that is comprised of the UL only carriers and available to be aggregated is not limited to the NCT, but may be applied to the LCT.

In case of adding the secondary cell in the primary cell, the primary cell may be the cell that operates as the TDD or the cell that operates as the FDD, and the secondary cell may be the UL only carrier.

In case that the UL only carrier is aggregated to the secondary cell and transmits the UL channel/signal, a cell identity (ID) is required. The cell ID is used for generating the UL channel/signal, and the existing cell ID may be acquired by the PSS/SSS. However, in case that the UL only carrier is comprised only UL subframes, it may be problematic since there is no DL subframe to receive the signal which is required to acquire a cell ID. In order to solve such a problem, the BS notifies the bit-sequence of the same length as the cell ID through the primary cell, and it may be used for a virtual cell ID.

Or, if there is the DL carrier in which the UL only carrier is linked by the SIB but is not used, the UE may use the cell ID of the DL carrier which is linked above as the virtual cell ID and use it as the UL signal/channel.

Or, if the UL only carrier follows the UL-DL configuration but does not used the DL subframe, the UE may use the cell ID of the DL subframe as the virtual cell ID and use it as the UL signal/channel.

Meanwhile, in case of adding the UL only carrier as the secondary cell, it is problematic through which DL subframe of the primary cell, the UL grant for the PUSCH which is to be transmitted from the UL subframe of the secondary cell is going to be transmitted by the BS (this is referred as a UL grant-PUSCH timing). In addition, it is problematic that the ACK/NACK for the PUSCH that is transmitted from the UL subframe of the secondary cell by the UE is going to be transmitted through the PHICH of which DL subframe of the secondary cell (this is referred as a PUSCH-PHICH timing).

The table below represents the existing UL grant-PUSCH timing according to the UL-DL configuration.

TABLE 4

| TDD UL/DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4/7 | 6/7 | | | | 4/7 | 6/7 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Table 4 above represents the k value in case that the UL grant that the BS transmits in the DL subframe n schedules the PUSCH that a UE transmits in subframe n+k. For example, in UL-DL configuration 3, the UL grant in subframe 0 that is the DL subframe represents subframe 0+4 that is the UL subframe, that is, to schedule the PUSCH of subframe 4. According to the UL-DL configuration, the case that the number of the UL subframe in a frame is more than the number of DL subframe may occur. Then, since one UL grant may schedule multiple UL subframes, the case that k value in Table 4 is multiple occurs.

Table below represents the existing PUSCH-PHICH timing according to the UL-DL configuration.

TABLE 5

| TDD UL/DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

With respect to the PUSCH that a UE transmits in UL subframe n, Table 5 represents $k_{PHICH}$ values in case that a BS the ACK/NACK for the PUSCH through the PHICH of DL subframe $n+k_{PHICH}$. For example, it is represented that, in UL-DL configuration 2, if a UE transmits PUSCH in subframe 2 that is the UL subframe, the ACK/NACK is transmitted through subframe 2+6 that is the DL subframe, that is, the PHICH of subframe 8.

Table 5 above may be represented as Table 6 below. Table 6 represents the k value in case that the PHICH in DL subframe i carries the ACK/NACK for the PUSCH which is transmitted in UL subframe i−k.

TABLE 6

| TDD UL/DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7/6 | 4 | | | | 7/6 | 4 | | | |
| 1 | | 4 | | | | | | 4 | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | | 7 | 4 | | 6 |

Meanwhile, according to the UL-DL configuration, the case that the number of the UL subframe in a frame is more than the number of DL subframe may occur. For example, in UL-DL configuration 0, the number of UL subframe is more than that of the DL subframe. In this case, the ACK/NACK for multiple PUSCHs may be transmitted in one UL subframe. For example, in subframes 0 and 5 of UL-DL configuration 0, the ACK/NACK for multiple PUSCHs may be transmitted.

In case that the UL only carrier is added in the primary cell as the secondary cell, it is problematic how to determine the timing between the UL grant of the primary cell and the PUSCH of the secondary cell (UL grant-PUSCH timing) and the timing between the PUSCH of the secondary cell and the PHICH of the primary cell.

Method 1.

The existing FDD has the HARQ-ACK timing when transmitting the ACK/NACK for a data unit (for example, a transmission block, codeword, and etc.) that a UE receives in subframe n−4 by subframe n.

In TDD has the HARQ-ACK timing as represented by following table. In Table 4, each value may be represented by aggregation K, and has the element of $K=\{k_0, k_1, \ldots, k_{M-1}\}$. For example, in UL-DL configuration 1, $K=\{7, 6\}$ and M=2 for subframe 2. The terms $k_0, k_1, \ldots, k_{M-1}$ may be represented by $k_m$ (m=0, 1, ..., or M−1).

TABLE 7

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 7 shown above represents the corresponding relation of the DL subframe $n-k_m$ that corresponds to UL subframe n in each UL-DL configuration as the value of $k_m$. That is, it signifies that the ACK/NACK for the PDSCH which is transmitted from subframe $n-k_m$ is transmitted from UL subframe n.

In case of using the UL only carrier for a secondary cell, the PUSCH-PHICH timing may follow the HARQ-ACK timing which is configured by the UL-DL configuration of a primary cell.

For example, in case that the primary cell is a TDD cell and the UL-DL configuration is 1, the ACK/NACK for the PUSCH which is transmitted from subframe 2 of the primary cell is transmitted through the PHICH of subframe 6 of the primary cell. Accordingly, the ACK/NACK for the PUSCH which is transmitted from subframe 2 of the secondary cell is also transmitted through the PHICH of subframe 6 of the primary cell.

Method 2.

There is a configuration that the number of DL subframe is more than that of the UL subframe in a frame among the UL-DL configurations. For example, UL-DL configurations 0, 3, 6, and the like have more DL subframes more than UL subframes. Like this, the DL HARQ-ACK timing according to the UL-DL configuration that has more DL subframes may be used as the HARK-ACK reference timing of a secondary cell. However, the UL subframes according to the UL-DL configuration of the secondary cell should be subset of the UL subframes according to the UL-DL configuration of a primary cell.

For example, in case that the UL-DL configuration of the primary cell is 1, 2 or 6, the HARQ-ACK timing according to UL-DL configurations 0 and 6 may be used as the HARK-ACK reference timing of a secondary cell. In case that the UL-DL configurations of the primary cell are 3, 4 and 5, the HARQ-ACK timing according to UL-DL configurations 0, 3 or 6 may be used as the HARK-ACK reference timing of a secondary cell.

In Method 1 or 2 described above, according to the UL-DL configuration which is applied to the UL subframe of the secondary cell which is overlapped with the DL subframe of the primary cell or to the secondary cell, it is required to be additionally determined the UL grant-PUSCH timing for the UL subframe of the secondary cell that corresponds to the DL subframe and the PUSCH-PHICH timing.

In the methods to be described below, the DL subframe in which the UL grant or PHICH is transmitted is the DL subframe of the primary cell according to the UL-DL configuration of the primary cell or the DL subframe of the primary cell according to the UL-DL configuration which is applied to the secondary cell. The S subframe may not be included in the DL subframe and may be included only for specific UL-DL configuration. In addition, the DL subframe in which the UL grant or PHICH is transmitted may be considered except subframes 0, 1, 5 and 6 which are fixed as the DL subframe for all UL-DL configurations.

Methods 1 and 2 and Methods 3 to 7 that will be described below may be used with being combined.

Methods 3 to 7 are for the case on which way UL the subframe n+k is determined when a UE receives the UL grant from the DL subframe n of the primary cell and transmits the PUSCH which is scheduled by the UL grant from the UL subframe n+k of the secondary cell.

Method 3.

The UL subframe n+k of the secondary cell that transmits the PUSCH may be selected as the subframe of the fastest secondary cell that satisfy the minimum required time (for example, $k_m=4$) required to transmit the PUSCH from the DL subframe n of the primary cell that receives the UL grant.

Method 4.

Method 4 is the method that the number of UL grant transmitted from each DL subframe is to be equally arranged in the multiple DL subframes preferably without being biased to a specific DL subframe by equalizing the number of DL subframe of the primary cell that corresponds to each UL subframe of the secondary cell preferably.

First of all, Method 4 selects the subframe of the secondary primary cell that satisfies the minimum required time (for example, $k_m=4$) which is required to transmit the PUSCH after receiving UL grant in each DL subframe of the primary cell. By setting the biggest value $k_m$ which is determined in each DL subframe as reference timing, the DL subframe of the primary cell where the UL grant is to be located for the PUSCH which is to be transmitted from each subframe of the secondary cell is determined As an example, the maximum number of UL grant that is available to be transmitted by one DL subframe is determined, and if it exceed the maximum number of the UL grant, it can be determined that the UL grant that exceeds the maximum number is to be transmitted from the next DL subframe or the previous DL subframe. In this time, the DL subframe is changed such that the UL grant for the forgoing PUSCH is not to be located later than the UL grant for the following PUSCH. The maximum number of UL grant may be changed according to the UL-DL configuration.

When equally distributing the DL subframe of the primary cell in which a BS transmits UL grant, the method of equally distributing with including the timing in the existing UL-DL configuration, or the method of equally distributing with new timing, that is, the timing which is added in case of using the secondary cell as the UL only carrier can be considered.

In case of performing equal distribution considering the timing of the existing UL-DL configuration, the UL grant-PUSCH timing as represented by Table 8 below may be added to Table 4.

TABLE 8

| UL/DL Configuration (PCell) | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | | | | 5 | 5 | | | |
| 1 | 4, 5 | 5 | | | | 4, 5 | 5 | | | |
| 2 | 4 | 4, 5 | | 4 | 4 | 4, 5 | | 4 | | |
| 3 | 6 | 6, 7 | | | 4 | | | 4 | 4 | 6 |
| 4 | 4, 5 | 5, 6 | | 4 | 4 | | 4 | 4 | | |
| 5 | 4 | 4, 5 | 4 | 4 | 4 | | 4 | 4 | 4 | |
| 6 | 6 | 8 | | | | 5 | 5 | | | 6 |

According to the method of equally distributing for only new timing, the UL grant-PUSCH timing as represented by Table 9 may be added to Table 4.

TABLE 9

| UL/DL Configuration (PCell) | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | | | | 5 | 5 | | | |
| 1 | 5 | 5 | | | 5 | 5 | 5 | | | 5 |
| 2 | 5 | 5 | | 5 | 5 | 5 | 5 | | 5 | 5 |
| 3 | 7 | 7 | | | | 4 | 4 | 4 | 7 | 7 |
| 4 | 6 | 6 | | | 4 | 4 | 4 | 4 | 6 | 6 |
| 5 | 5 | 5 | 4 | 4 | 4 | 4 | 4 | 4 | 5 | 5 |
| 6 | 6 | 8 | | | | 5 | 5 | | | 6 |

Figure 13:
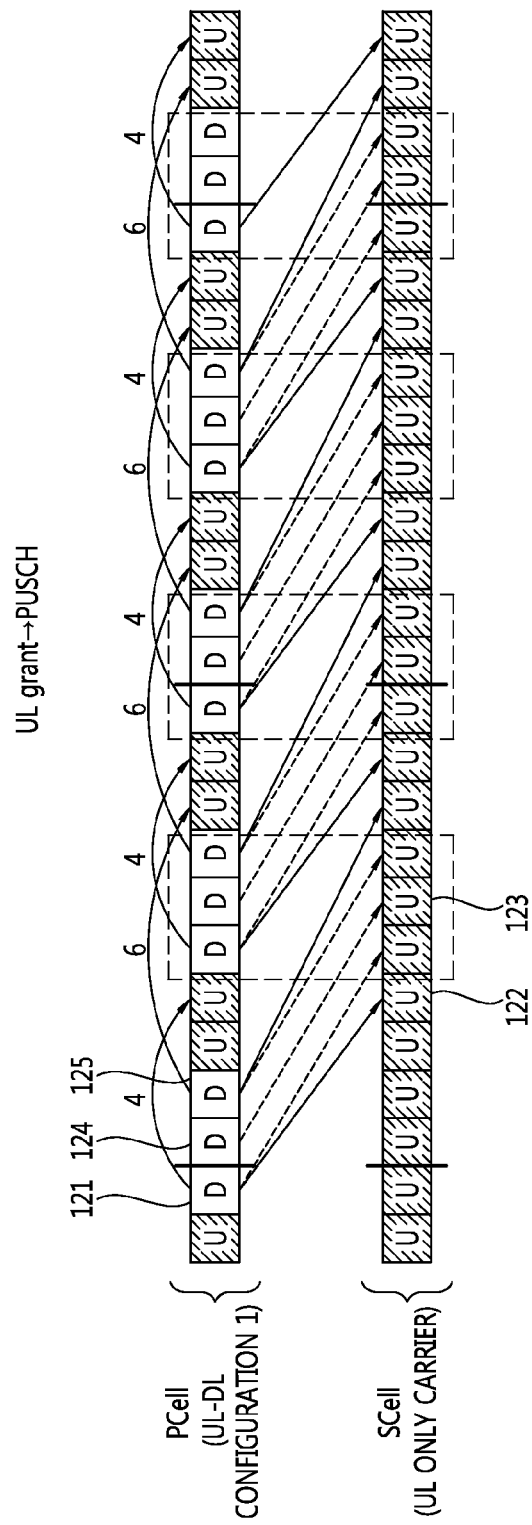
FIG. 13 shows the UL grant-PUSCH timing in case that Method 1 and Method 4 are combined.

FIG. 13 shows the UL grant-PUSCH timing in case that Method 1 and Method 4 are combined.

Referring to FIG. 13, the primary cell is a TDD cell according to UL-DL configuration 1, and the secondary cell uses the UL only carrier. In this case, the secondary cell is comprised of only UL subframes. The UL grant which is located in the DL subframe 21 of the primary cell is for the PUSCH of the UL subframe of the secondary cell. That is, the UL subframe 122 of the secondary cell is determined according to the UL grant-PUSCH timing of the primary cell. The solid arrow lines in FIG. 13 represents the UL subframe of the secondary cell which is determined according to the UL grant-PUSCH timing of the primary cell.

Meanwhile, the UL grant-PUSCH timing of the UL subframe of the secondary cell which is overlapped with the DL subframe of the primary cell is set according to Method 4, becomes the UL grant-PUSCH timing shown by the dotted arrow lines in FIG. 13. For example, the UL grant for the PUSCH which is located in the subframe 123 is transmitted from the DL subframe 124, not from the closest DL subframe which is located behind 4 subframes. This is for equal distribution. In this case, the maximum number of UL grant which is available to be transmitted from one DL subframe may be two.

According to the method, there is an effect of dispersing load since the number of UL grant that should be transmitted from one DL subframe can be equalized.

Method 5.

This is the method of limiting the PUSCH scheduling for a specific UL subframe of the secondary cell. Exceptionally, retransmission of the PUSCH that does not require the UL grant from the specific UL may be allowed.

Method 6.

Method 6 is the method of signaling the relation between the UL subframe where the PUSCH is transmitted from the secondary cell and the DL subframe of the primary cell where the corresponding UL grant is transmitted by radio resource control (RRC). Method 6 may be applied to overall UL subframes of the secondary cell as well as to the UL subframe of the secondary cell which is overlapped with the DL subframe of the primary cell, and also may be commonly or partly applied to the case of aggregating carriers having different UL-DL configurations.

Method 7.

This is the method of transmitting all UL grants from subframes 0, 1, 5 and 6 of the primary cell in case that UL-DL configuration 0 is used in the secondary cell.

In Methods 3 to 7 described above, in case that multiple UL subframes and one DL subframe are corresponded by the UL grant-PUSCH timing, the UL grants for each UL subframe may be individually coded or schedule multiple PUSCHs by one UL grant.

In addition, in case that one DL subframe and three or more UL subframes are corresponded by the UL grant-PUSCH timing, 1) it indicates 3 UL subframes by increasing UL index bit, and 2) the PUSCH scheduling for a specific UL subframe may be limited.

Hereinafter, the PUSCH-PHICH timing will be described below in case that the UL only carrier is added as the secondary cell.

Method 8.

A BS may transmit the ACK/NACK for the PUSCH from the DL subframe of the primary cell after a minimum required time (for example, $k_{min}=4$) to transmit the PHICH according to the UL subframe of the secondary cell as a standard that receives the PUSCH through the PHICH.

Method 9.

This is the method that the number of PHICH transmitted from each DL subframe is to be equally arranged in the all DL subframes preferably without being biased to a specific DL subframe by equalizing the number of DL subframe of the primary cell that corresponds to each UL subframe of the secondary cell preferably.

First of all, a BS selects the fastest DL subframe that satisfies the minimum required time which is available to transmit the PHICH after receiving the PUSCH. If the number of PHICH which is to be transmitted from the selected DL subframe exceeds a predetermined value, the exceeded PHICH may be transmitted from the next DL subframe of the fastest DL subframe.

There is an effect of dispersing load since the number of PHICH that should be transmitted from one DL subframe can be equalized. After selecting the DL subframes that is going to transit the PHICH for each UL subframes by Method 8 without considering the equal distribution (that is, obtaining the $k_{PHICH}$ value for each UL subframes), the biggest $k_{PHICH}$ value is obtained and the equal distribution can be performed according to the biggest $k_{PHICH}$ value as a standard. In this time, the PHICH for the foregoing PUSCH should not be latter than the PHICH for the following PUSCH.

In addition, when performing equally distributing, the equal distribution may be performed with the existing PUSCH-PHICH timing being included in addition to the existing UL-DL configuration, or may be performed for only new timing which is added by configuring the UL only carrier as the secondary cell.

In case that the PHICH resource is not present in the PDCCH region of the DL subframe of the primary cell, new PHICH resource may be configured in the PDSCH region of the DL subframe and used. The new PHICH resource is referred to as an enhanced-PHICH (E-PHICH) resource.

Method 10.

The subframe that has the PHICH or e-PHICH resource among the DL subframes of the primary cell is only configured as the equal distribution object for PHICH transmission, and the only configured DL subframes are equally distributed by Method 9.

In addition, when performing equally distributing, the equal distribution may be performed with the existing PUSCH-PHICH timing being included in addition to the existing UL-DL configuration, or may be performed for only new timing which is added by configuring the UL only carrier as the secondary cell.

Method 11.

The PHICH is equally distributed following Method 9, but it may be limited that the UL HARQ process of the secondary cell that corresponds to the DL subframe that does not have the PHICH resource among the DL subframes of the primary cell is to be performed by only UL grant without the PHICH.

When performing equally distributing, the equal distribution may be performed with the existing PUSCH-PHICH timing being included in addition to the existing UL-DL configuration, or may be performed for only new timing which is added by configuring the UL only carrier as the secondary cell.

Method 12.

The PHICH is equally distributed following Method 9, but the UL HARQ process which is performed in the UL subframe of the secondary cell which is overlapped with the DL subframe of the primary cell may be retransmitted only by the UL grant without the PHICH.

Method 13.

This is the method of limiting the PUSCH scheduling for the UL subframe of the secondary cell which is overlapped with the DL subframe of the primary cell.

In this time, exceptionally, the PUSCH transmission that does not required to retransmit to the UL subframe may be allowed. For example, this includes non-periodic CSI transmission, transmission of the CSI using the PUSCH and ACK/NACK, and so on.

Method 13 may be performed even though the UL-DL configuration which is comprised of the UL subframe in the UL-DL configuration of Table 3 is not introduced. The existing configurations 0 to 6 are allocated to the UL only carrier, but it is not required to configure the DwPTS, GP and UwPTS since the DL subframe is not used, and all of the S subframes may be used as the same structure as different UL subframes. In this case, when a BS aggregates the UL only carrier as the secondary cell, the BS may perform signaling of notifying that it is the UL only carrier together with the UL-DL configuration information. The signaling may include the information of notifying whether the DL subframe is used in the corresponding UL-DL configuration and whether all of the S subframe is used as the UL subframe.

Method 14.

This is the method of signaling the relation between the UL subframe of the secondary cell where the PUSCH is transmitted and the DL subframe of the primary cell where the PHICH that corresponds to the PUSCH is transmitted by radio resource control (RRC). This method may be applied to overall UL subframes of the secondary cell as well as to the UL subframe of the secondary cell which is overlapped with the DL subframe of the primary cell. In addition, this may also be commonly or partly applied to the case of aggregating cells having different UL-DL configurations.

Method 15.

This is the method of limiting that the ACK/NACK is to be transmitted from only UL subframes 0, 1, 5 and 6 in case that UL-DL configuration 0 is used for the UL-DL configuration of the secondary cell in Method 2.

The DL subframe in which the PHICH resource is not configured in the PDCCH region in Methods 8 to 15 may be the DL subframes in which numeral is not filled in.

Figure 14:
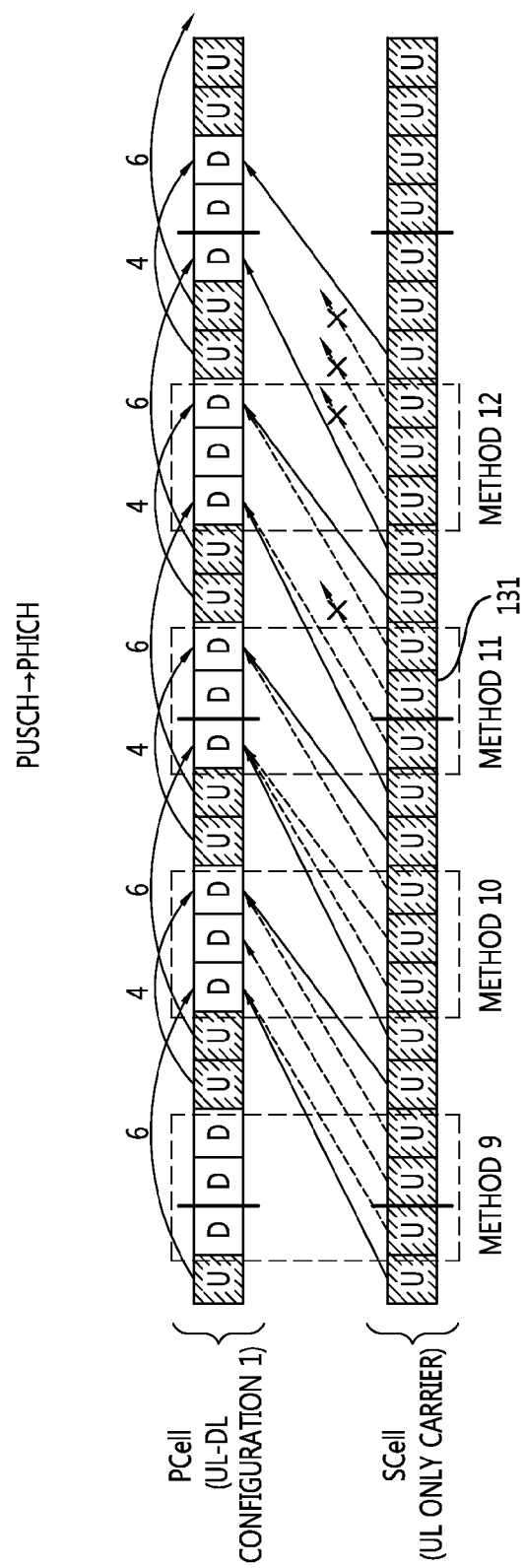
FIG. 14 illustrates the PUSCH-PHICH timing in case of combining Method 1 and Method 9, 10, 11 or 12.

FIG. 14 illustrates the PUSCH-PHICH timing in case of combining Method 1 and Method 9, 10, 11 or 12.

For the UL subframes of the secondary cell which are overlapped with the DL subframe of the primary cell, according to Method 9, the DL subframes where the PHICH is located are equally distributed. Maximum 2 PHICHs for the UL subframes may be transmitted to one DL subframe. According to Method 10, 3 PHICHs for the UL subframes may be transmitted to one DL subframe. According to Method 11, the PHICH for the PUSCH which is transmitted from some UL subframe 131 among the UL subframes of the secondary cell which are overlapped with the DL subframes of the primary cell is not transmitted from the primary cell. Or, the PUSCH for some UL subframe 131 may not be scheduled. According to Method 12, the PHICH for the PUSCH which is transmitted from respective UL subframes of the secondary cell which are overlapped with the DL subframes of the primary cell is not transmitted from the primary cell. In this time, HARQ retransmission is performed only by the UL grant. Or, the PUSCH may not be scheduled for the UL subframes of the secondary cell which are overlapped with the DL subframes of the primary cell.

Table 10 below represents the $k_{PHICH}$ value for the UL subframes of the secondary cell which are overlapped with the DL subframes of the primary cell in case that Method 1 and Method 9 are combined and applied, and represents the values added to Table 5.

TABLE 10

| UL/DL Configuration (PCell) | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | | | | 5 | 5 | | | |
| 1 | 5 | 5 | | | 5 | 5 | 5 | | | 5 |
| 2 | 5 | 5 | 5 | 5 | 5 | 5 | | | 5 | 5 |
| 3 | 7 | 7 | | | | 4 | 4 | 4 | 7 | 7 |
| 4 | 6 | 6 | | | 4 | 4 | 4 | 4 | 6 | 6 |
| 5 | 5 | 5 | 4 | 4 | 4 | 4 | 4 | 4 | 5 | 5 |
| 6 | 6 | 8 | | | | 5 | 5 | | | 6 |

Table 10 below, in case of transmitting the PUSCH from the subframe n of the secondary cell and transmitting the PHICH that corresponds to the PUSCH from the subframe n+$k_{PHICH}$ (that is, the channel that transmits the ACK/NACK for the PUSCH), represents the $k_{PHICH}$.

Table 11 below, in case that the PHICH in the DL subframe i of the primary cell is the response to the PUSCH which is transmitted from the UL subframe i-k of the secondary cell, represents the k value for the DL subframe i. Table 11 represents k values added to Table 6.

TABLE 11

| UL/DL Configuration (PCell) | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | | | | 5 | 5 | | | |
| 1 | 5 | 5 | | | 5 | 5 | 5 | | | 5 |
| 2 | 5 | 5 | | 5 | 5 | 5 | 5 | | 5 | 5 |
| 3 | 4 | 4 | | | | | 7 | 7 | 7 | 4 |
| 4 | 4 | 4 | | | 6 | 6 | 6 | 6 | 4 | 4 |
| 5 | 4 | 4 | | 5 | 5 | 5 | 5 | 4 | 4 | 4 |
| 6 | 5 | 5 | | | | | 6 | 6 | | 8 |

Table 12 below represents additional $k_{PHICH}$ value in case that Method 9 is combined with Method 1 and applied.

TABLE 12

| UL/DL Configuration (PCell) | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | | | | 5 | 5 | | | |
| 1 | 4, 5 | 5 | | | | 4, 5 | 5 | | | |
| 2 | 4, 5 | 4, 5 | | 5 | 5 | 5 | 5 | | 5 | 5 |
| 3 | 7 | 7 | | | | | 4 | 4 | 4 7 | 7 |
| 4 | 6 | 6 | | | 4 | 4 | 4 | 4 | 6 | 6 |
| 5 | 5 | 5 | | 4 | 4 | 4 | 4 | 4 | 5 | 5 |
| 6 | 6 | 8 | | | | | 5 | 5 | | 6 |

Meanwhile, for the cell which is comprised of only UL only carriers, since there is no corresponding DL carrier, the UL grant and PHICH may not transmitted to the same cell. That is, it operates as the cell not having the PHICH. Accordingly, it is assumed that a UE receives ACK for the PUSCH which is transmitted by UL only carrier without the PHICH, or may receive the PHICH in the cell that receives the UL grant of the corresponding PUSCH. Or, the UE may receive the PHICH in the cell which is designated as the RRC or receive the PHICH in different cell having the UL-DL configuration which is the same as the UL only carrier. Or, in case of using the UL only carrier that uses only UL subframe which is determined according to the UL-DL configuration, the UE may receive the PHICH without receiving the scheduling in from the DL subframe.

In case that DL only carrier or UL only carrier are aggregated as the secondary cell in the primary cell that is operated by TDD or FDD, the DL only carrier or the UL only carrier may be DL carrier or UL carrier that is selected in the cell defined as a pair of UL carrier and DL carrier.

The BS notifies the cell ID of the cell that is defined as the pair of UL carrier and DL carrier to the UE, and may signal the information to the UE whether the both UL carrier and DL carrier are aggregated at the same time or either one is aggregated in the cell that is defined as the pair of the UL carrier and the DL carrier. The above information may be comprised of two-bit bitmap, and each bit of the bitmap may correspond to each UL carrier and DL carrier of the cell that is defined as a pair of the UL carrier and DL carrier. According to each bit value, it is available to inform which one is aggregated to the secondary cell of the UL carrier and the DL carrier.

The information may be performed dynamically with L2/L1 signaling. As an example of the L2 signaling, it is available to directly indicate the MAC message that is including the information that indicates the DL carrier and the UL carrier. Or for example of an indirect method, it is also available to notify activation/non-activation that are applied to DL carrier/UL carrier in common by existing cell unit with separating by DL carrier/ UL carrier.

As for L1 signaling, it is available to notify by using an exclusive control channel that sets up carrier or DL/UL scheduling control channel. In case of using the DL/UL scheduling control channel, it may be set up to ignore the DL/UL scheduling.

Additionally, in case that DL only carrier or UL only carrier are aggregated in the primary cell that is operated in TDD or FDD, by notifying the cell ID of the cell defined for TDD (that is, the cell that is configured with the carrier having the mixture of DL/UL subframes) and the cell that corresponds to the cell ID above may be aggregated to the secondary cell.

Figure 15:
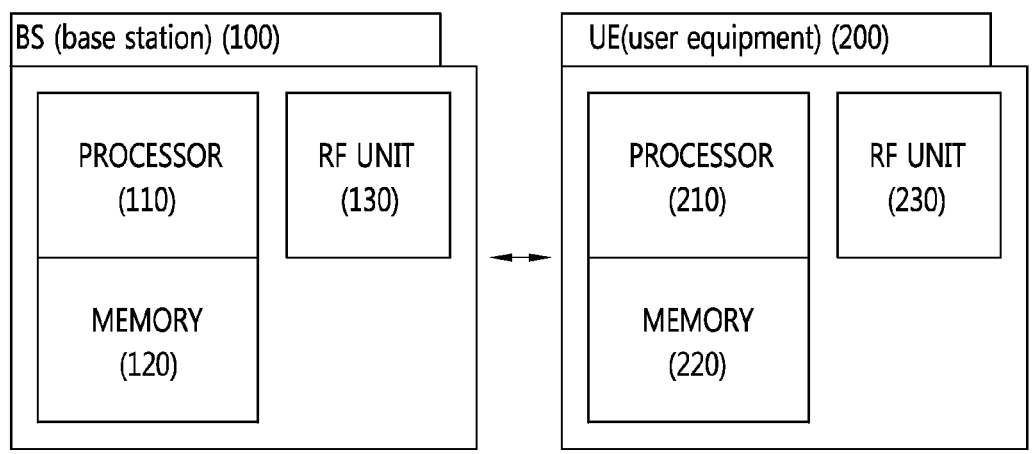
FIG. 15 is a block diagram showing a wireless apparatus for implementing an embodiment of the present invention.

FIG. 15 is a block diagram illustrating a wireless device in which an embodiment of the present invention is implemented.

A BS 100 includes a processor 110, a memory 120, and a radio frequency (RF) unit 130. The processor 110 implements the proposed functions, procedures, and/or methods. For example, the processor 110 configures multiple carriers (serving cells) to the UE, transmits a data unit, and receives ACK/NACK for the data unit according to the HARQ-ACK timing. In case of configuring the UL only carrier as the secondary cell, it may be configured through only UL-DL configuration as represented by Table 3, or configured through the switch information with the UL-DL configuration. In addition, the UL grant-PUSCH timing and the PUSCH-PHICH timing are determined. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 may configure the UL only carrier as the secondary cell using the UL-DL configuration and/or the switch information. The ACK/NACK for the data unit which is received through the secondary cell is transmitted through the primary cell, and the UL grant that schedules the data unit and the timing for the data unit (PUSCH) and the timing for receiving the ACK/NACK for the PUSCH (PUSCH-PHICH timing) may refer Methods 1 to 15 above described. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method for aggregating carriers by a base station (BS) in a wireless communication system, the method comprising:

configuring a first carrier with a first carrier uplink/downlink (UL/DL) configuration that identifies each subframe in a frame of the first carrier as being a corresponding one of an UL subframe, a DL subframe or a special subframe so that the first carrier UL/DL configuration includes each of an UL subframe, a DL subframe and a special subframe;

configuring a second carrier in addition to the first carrier with a second carrier UL/DL configuration that identifies each subframe in a frame of the second carrier as being a corresponding one of an UL subframe, a DL subframe or a special subframe so that the second carrier UL/DL configuration includes each of an UL subframe, a DL subframe and a special subframe, transmitting, to a user equipment (UE), the first and second carrier UL/DL configuration information;

transmitting data to the UE via the first and second carriers in accordance with the first and second carrier UL/DL configuration information;

transmitting, to the UE, a third UL/DL configuration that switches a subframe of at least one of the first or second UL/DL configurations to form a switched UL/DL configuration; and transmitting data to the UE in accordance with the switched UL/DL configuration and any unswitched UL/DL configuration, wherein each of the first carrier or the second carrier is a time division duplex (TDD) carrier in which each of one of the UL subframe, the DL subframe or the special subframe are located on a different time in the frame, and wherein the third UL/DL configuration is restricted to only change an UL subframe of the one of the first or second UL/DL configuration to a DL subframe without changing any DL subframe or any special subframe of the one of the first or second UL/DL configuration.

2. The method of claim 1, wherein the frame consists of 10 subframes.

3. The method of claim 2, wherein each of the first and second UL/DL configurations indicates any one of uplink-downlink configurations included in the below table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

4. A base station (BS) apparatus configured to aggregate carriers in a wireless communication system, the BS apparatus comprising:

a radio frequency (RF) unit comprising at least one antenna that transmits and receives a radio signal; and a processor operating functionally connected with the RF unit, wherein the processor is configured to
    configure a first carrier with a first carrier uplink/downlink (UL/DL) configuration that identifies each subframe in a frame of the first carrier as being a corresponding one of an UL subframe, a DL subframe or a special subframe so that the first carrier UL/DL configuration includes each of an UL subframe, a DL subframe and a special subframe;
    configure a second carrier in addition to the first carrier with a second carrier UL/DL configuration that identifies each subframe in a frame of the second carrier as being a corresponding one of an UL subframe, a DL subframe or a special subframe so that the second carrier UL/DL configuration includes each of an UL subframe, a DL subframe and special subframe,
    transmit, to a user equipment (UE), the first and second carrier UL/DL configuration information;
    transmit data to the UE in accordance via the first and second carriers in accordance with the first and second carrier UL/DL configuration information;
    transmit, to the UE, a third UL/DL configuration that switches a subframe of at least one of the first or second UL/DL configurations to form a switched UL/DL configuration; and
    transmit data to the UE in accordance with the switched UL/DL configuration and any unswitched UL/DL configuration,
    wherein each of the first carrier or the second carrier is a time division duplex (TDD) carrier in which each of one of the UL subframe, the DL subframe or the special subframe are located on a different time in the frame, and
    wherein the third UL/DL configuration is restricted to only change an UL subframe of the one of the first or second UL/DL configuration to a DL subframe without changing any DL subframe or any special subframe of the one of the first or second UL/DL configuration.

5. The BS apparatus of claim 4, wherein the frame consists of 10 subframes.

6. The BS apparatus of claim 5, wherein each of the first and second UL/DL configurations indicates any one of uplink-downlink configurations included in the below table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

7. A method for aggregating carriers by a user equipment (UE) in a wireless communication system, the method comprising:
    receiving, from a base station (BS), uplink/downlink (UL/DL) configuration information that identifies each subframe in a frame of a first carrier and a second carrier as being a corresponding one of an UL subframe, a DL subframe or a special subframe so that the UL/DL configuration includes, for each of the first carrier and the second carrier, each of an UL subframe, a DL subframe and a special subframe;
    receiving data via the first carrier and the second carrier that are configured per the received UL/DL configuration;
    detecting an alternative UL/DL configuration; and
    receiving data via the first carrier and the second carrier, at least one of the first carrier or the second carrier having been reconfigured per the detected alternative UL/DL configuration,
    wherein at least one of the first carrier or the second carrier is a time division duplex (TDD) carrier in which each corresponding one of the UL subframe, the DL subframe or the special subframe are located on different time in the frame, and
    wherein the alternative UL/DL configuration is restricted to only change an UL subframe of the received UL/DL configuration to a DL subframe without changing any DL subframe or any special subframe of the received UL/DL configuration.

8. The method of claim 7, wherein the frame consists of 10 subframes.

9. The method of claim 8,
    wherein the UL/DL configuration information indicates, for each of the first carrier and the second carrier, any one of uplink/downlink configurations included in the below table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

10. A user equipement (UE) configured to aggregate carriers in a wireless communication system, the UE comprising:
    a radio frequency (RF) unit comprising at least one antenna that transmits and receives a radio signal; and
    a processor operating functionally connected with the RF unit,
    wherein the processor is configured to
        receive, from a base station (BS), UL/DL configuration information that identifies each subframe in a frame of a first carrier and a second carrier as being a corresponding one of an UL subframe, a DL subframe or a special subframe so that the UL/DL configuration includes, for each of the first carrier and the second carrier, each of an UL subframe, a DL subframe and a special subframe;
        receive data via the first carrier and the second carrier that are configured per the received UL/DL configuration;
        detect an alternative UL/DL configuration; and
        receive data via the first carrier and the second carrier, at least one of the first carrier or the second carrier having been reconfigured per the detected alternative UL/DL configuration,
        wherein at least one of the first carrier or the second carrier is a time division duplex (TDD) carrier in which each corresponding one of the UL subframe, the DL subframe or the special subframe are located on different time in the frame, and wherein the alternative UL/DL configuration is restricted to only change an UL subframe of the received UL/DL configuration to a DL subframe without changing any DL subframe or any special subframe of the received UL/DL configuration.

11. The UE of claim 10, wherein the frame consists of 10 subframes.

12. The UE of claim 11, wherein the UL/DL configuration information indicates, for each of the first carrier and the second carrier, any one of uplink/downlink configurations included in the below table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

\* \* \* \* \*